US006948535B2

(12) United States Patent
Stegemoeller

(10) Patent No.: US 6,948,535 B2
(45) Date of Patent: Sep. 27, 2005

(54) APPARATUS AND METHOD FOR ACCURATELY METERING AND CONVEYING DRY POWDER OR GRANULAR MATERIALS TO A BLENDER IN A SUBSTANTIALLY CLOSED SYSTEM

(75) Inventor: Calvin L. Stegemoeller, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 47 days.

(21) Appl. No.: 10/757,861

(22) Filed: Jan. 15, 2004

(65) Prior Publication Data

US 2005/0155667 A1 Jul. 21, 2005

(51) Int. Cl.⁷ ................................................ B65B 1/04
(52) U.S. Cl. ....................... 141/67; 141/256; 222/413
(58) Field of Search ................. 141/67, 2, 18, 141/256; 222/413; 198/662, 666, 670, 671; 414/526

(56) References Cited

U.S. PATENT DOCUMENTS

| | | | |
|---|---|---|---|
| 1,022,305 A | * | 4/1912 | Dean |
| 2,115,464 A | * | 4/1938 | Kirby |
| 2,517,456 A | * | 8/1950 | Wherrett |
| 3,792,790 A | * | 2/1974 | Brubaker .................. 414/332 |
| 4,490,047 A | | 12/1984 | Stegemoeller et al. ...... 366/132 |
| 4,802,141 A | | 1/1989 | Stegemoeller et al. ...... 366/132 |
| 4,850,701 A | | 7/1989 | Stegemoeller et al. ...... 366/132 |
| 4,850,750 A | | 7/1989 | Cogbill et al. ............... 406/82 |
| 4,854,714 A | | 8/1989 | Davis et al. ................ 366/132 |
| 4,898,473 A | | 2/1990 | Stegemoeller et al. ...... 366/132 |
| 4,900,157 A | | 2/1990 | Stegemoeller et al. ...... 366/132 |
| 4,913,554 A | | 4/1990 | Bragg et al. ............... 366/132 |
| 4,919,540 A | | 4/1990 | Stegemoeller et al. ...... 366/132 |
| 4,991,632 A | * | 2/1991 | Nordmeyer et al. .......... 141/1 |
| 5,333,762 A | * | 8/1994 | Andrews ..................... 222/238 |
| 5,452,954 A | | 9/1995 | Handke et al. ............. 366/16 |
| 5,522,459 A | | 6/1996 | Padgett et al. ............. 166/285 |
| 5,570,743 A | | 11/1996 | Padgett et al. ............. 166/285 |
| 5,906,471 A | * | 5/1999 | Schwoerer ................ 414/505 |

OTHER PUBLICATIONS

Prater Industries, Inc. brochure entitled "Rotary Airlock Feeders," undated but admitted to be prior art.

Flexicon brochure entitled "Innovative approach to weigh/batch mixing Directly from bulk bags improves efficiency and workplace safety for a world leader in crop protection," undated but admitted to be prior art.

Flexicon brochure entitled "Automated turnkey batching, blending, Extrusion system provides 18 month R.O.I.," undated but admitted to be prior art.

* cited by examiner

Primary Examiner—Steven O. Douglas
(74) Attorney, Agent, or Firm—John W. Wustenberg; Baker, Botts L.L.P.

(57) ABSTRACT

The present invention is directed to an apparatus and method for accurately metering and conveying a dry powder or granular material to a blender in a substantially closed system. The apparatus includes a storage tank adapted to hold the dry powder or granular material, a hopper disposed inside of the storage tank; and a conveyor at least partially disposed inside of the storage tank, which delivers the dry powder or granular material to the hopper. The apparatus also includes a metering feeder adapted to deliver the dry powder or granular material at a substantially uniform density from the hopper to a blender located outside of the storage tank. The apparatus is a substantially closed system, thus minimizing the risk that the dry powder or granular material will become airborne.

26 Claims, 3 Drawing Sheets

APPARATUS AND METHOD FOR ACCURATELY METERING AND CONVEYING DRY POWDER OR GRANULAR MATERIALS TO A BLENDER IN A SUBSTANTIALLY CLOSED SYSTEM

BACKGROUND

The present invention relates generally to apparatuses and methods for metering and conveying dry powder or granular materials to a blender, and more particularly to an apparatus and method for accurately metering and conveying dry powder or granular materials to a blender in a substantially closed system.

In conventional oil field operations, dry powder and granular materials are transported in sacks to the well location. The sacks are then manually moved to a metering feeder mounted on a fluid blending device. The metering feeder has a hopper to collect the dry powder or granular material and to serve as a reservoir. The hopper is kept full by opening sacks of the dry powder or granular material and dumping them into the hopper. The amount of dry powder or granular material must be kept at a constant level in the hopper so as to maximize the accuracy and repeatability of the metering feeder. The accuracy and repeatability of the metering feeder is dependent on having a constant material bulk density at the screw auger.

Fluctuating levels of powder or granular material in the hopper can alter the bulk density of the material, and thus negatively affect the desired quality of the oil field service fluid. However, it is difficult to maintain a constant feed of material to the hopper when the hopper is being filled manually. Thus, the drawback of such systems is that there is a likelihood the hopper will be either overfilled in which case dry powder or granular material is spilled, or underfilled in which case the bulk density will be altered, which in turn will reduce the quality of the oil field service fluid. In the case where the dry powder or granular material is spilled, material is lost and clean up is necessary, which translates into lost revenue. This method also generates a lot of dust since the hopper is open to the outside air.

Alternate methods have been proposed, which also have drawbacks of their own. One such method is to transport the dry powder or granular material to the well location in a large bulk tank and to convey the material pneumatically or mechanically to the metering feeder on the fluid blending device. This method, however, requires the conveying device to be controlled either automatically with level sensors and control loops, or manually in order to keep the dry powder or granular material at a constant level in the metering hopper for maximum accuracy and repeatability. Vehicle roading and equipment vibrations tend to compact the powder or granular material and cause significant variations in the bulk density of the material which affects the accuracy and repeatability of the metering feeder. This process is also labor intensive, susceptible to sensor failures and likely to generate dust.

SUMMARY

The present invention is directed to an apparatus and method that eliminates or at least minimizes the drawbacks of conventional dry powder and granular material metering and conveying systems.

In one embodiment, the present invention is directed to an apparatus for accurately metering and conveying a dry powder or granular material to a blender. The apparatus comprises a tank adapted to store the dry powder or granular material, a hopper disposed inside of the tank, and a conveyor that delivers the dry powder or granular material from the tank to the hopper in a substantially enclosed environment. The apparatus further comprises a metering feeder disposed at least partially within the tank and adapted to deliver the dry powder or granular material from the hopper to the blender at a substantially uniform density.

In another aspect, the present invention is directed to a method of accurately metering and conveying a dry powder or granular material to a blender comprising the steps of storing the dry powder or granular material in a tank; metering dry powder or granular material out of the tank to the blender at a substantially uniform density with a metering feeder; and supplying the metering feeder with dry powder or granular material in a substantially enclosed environment.

The features and advantages of the present invention will be readily apparent to those skilled in the art upon a reading of the description of the exemplary embodiments, which follows.

BRIEF DESCRIPTION OF THE DRAWINGS

A more complete understanding of the present disclosure and advantages thereof may be acquired by referring to the following description taken in conjunction with the accompanying drawings, which.

DESCRIPTION

Figure 1:
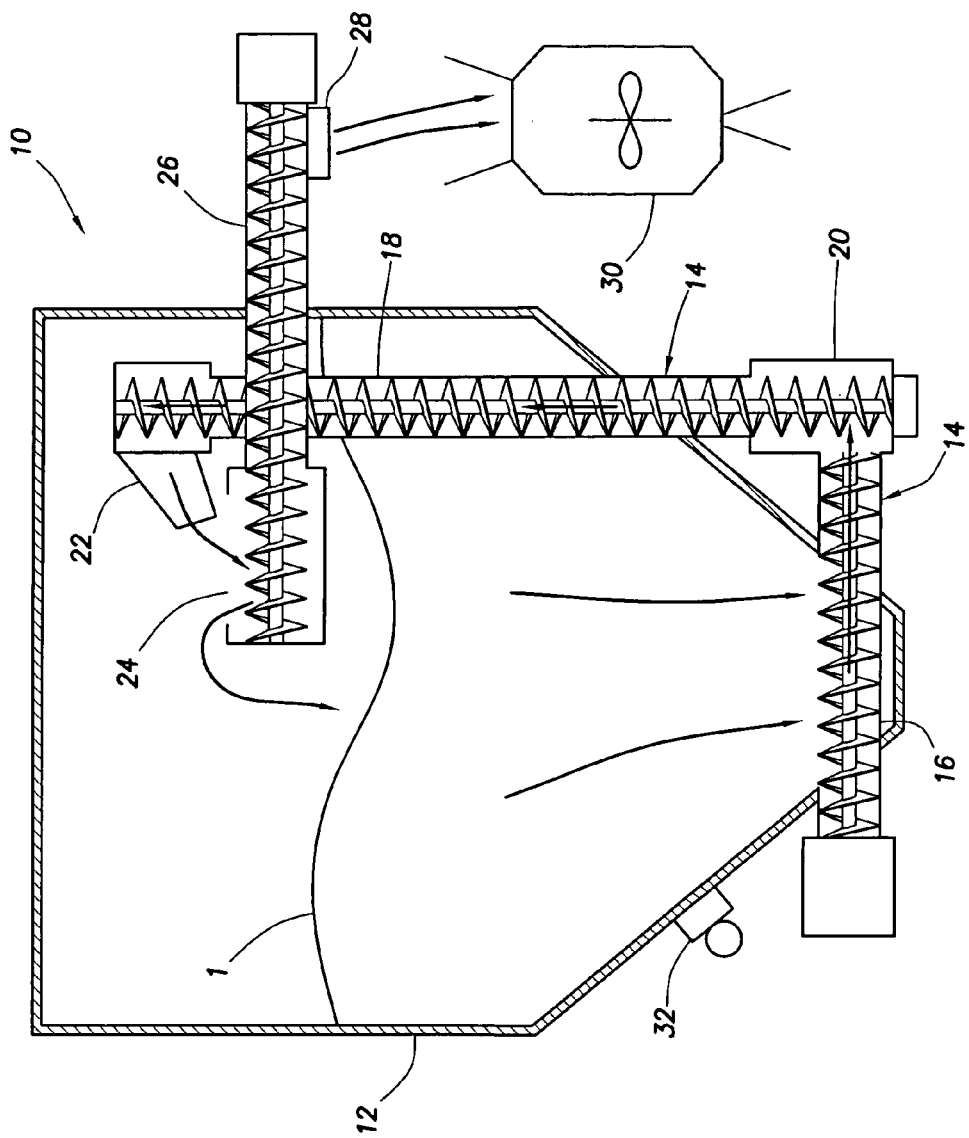
FIG. 1 is a schematic diagram of an apparatus for accurately metering and conveying a dry powder or granular material to a blender in accordance with the present invention.

The details of the present invention will now be described with reference to the accompanying drawings. Turning to FIG. 1, an apparatus for accurately metering and conveying a dry powder or granular material 1 in accordance with the present invention is shown generally by reference numeral 10. The apparatus 10 comprises a bulk material tank 12, which is generally cylindrical or rectangular in shape in its upper portion and generally funnel shaped in its lower portion. The bulk material tank 12 is generally a closed container. It has a sealable opening (not shown) for injecting dry powder or granular material into the tank and an outlet for discharging the dry powder or granular material, which is described in more detail below. The bulk material tank 12 is designed to be mobile, i.e., to be transportable to a work site, such as an oil and gas well, for example.

The apparatus 10 further comprises a conveyor 14, which has a horizontal section 16 attached at the base of the bulk material tank 12 and a vertical section 18, which couples to the horizontal section 16 at a junction box 20 located outside of the bulk material storage tank. In one certain embodiment, the horizontal and vertical sections 16, 18 of the conveyor 14 are screw augers, e.g., Martin Sprocket and Gear—Type 1 Super Screw Conveyor. In another embodiment, the vertical section 18 is a bucket elevator, e.g., Martin Sprocket and Gear—Series 100. The vertical section 18 of the conveyor 14 comprises a chute 22 for directing the dry powder or granular material 1 into a hopper 24 described in more detail below.

In one certain embodiment, the conveyor 14 is an enclosed and sealed structure. In this embodiment, the dry powder or granular material being transported by the conveyor 14 is not exposed to the outside environment. This is accomplished by forming the conveyor 14 with an outer housing that surrounds the augers or other conveying mechanisms and sealing the areas where the conveyor attaches to the bulk material tank 12 with elastomeric O-rings, brazing or other similar means. Alternatively, the outer housing of the conveyor 14 is integrally formed with the housing of the bulk material tank 12. In such an embodiment, the horizontal and vertical sections 16 and 18 are also sealed to the junction box 20 in much the same way, i.e., either by employing elastomeric seals, brazing or integral formation. As those of ordinary skill in the art will appreciate, alternate ways of enclosing and sealing the conveyor 14 may be employed. Those of ordinary skill in the art will also appreciate that the objectives of the present invention will be substantially met even if the conveyor 14 is not completely enclosed and sealed. Furthermore, those of ordinary skill in the art will also recognize that the conveyor 14 may be any known volumetric or mass conveyor system.

Turning to the hopper 24, it is essentially an open container, which temporarily collects the dry powder or granular material 1 and feeds it to metering feeder 26. The hopper 24 is mounted in the upper cylindrical portion of the bulk material tank 12. The hopper 24 is mounted above the fill line of the dry powder or granular material 1 in the tank and preferably as close to the top of the bulk material tank 12 as possible. The hopper 24 is open on the top to receive the dry powder or granular material 1 being ejected from the chute 22. In one certain embodiment, the hopper 24 is an Acrison Model 140. However, as those of ordinary skill in the art will appreciate, other devices may be used to temporarily collect the dry powder or granular material 1 and feed it to the metering feeder 26.

The metering feeder 26 is provided for metering the dry powder or granular material 1 out of the bulk material tank 12. In one certain embodiment, the metering feeder 26 is a high tolerance screw feeder that is capable of metering precise volumes of dry powder or granular material. In one embodiment, the metering feeder 26 is an Acrison Model 140. However, as those of ordinary skill in the art will appreciate, other similar precise metering devices can be employed. The metering feeder 26 is preferably attached to the base of the hopper 24. As can be seen from the figure, metering feeder 26 is partially disposed inside of the bulk material tank 12 and partially outside of the tank. Like conveyor 14, metering feeder 26 is also preferably enclosed and sealed. Metering feeder 26 comprises a chute 28, which operates to discharge the dry powder or granular material 1 from the bulk material tank 12. In certain embodiments, the metering feeder 26 discharges the dry powder or granular material 1 into mixing blender 30 for further processing. That is the case in oil and gas well applications. In one such application, the dry powder or granular material 1 is a ground guar or guar-derivative bean and is used in forming a completion gel. In another application, the dry powder or granular material 1 is any one or more of the dry components used in forming a downhole cement slurry. As those of ordinary skill in the art will recognize, however, the dry powder or granular material 1 may be any material and used in any application requiring one or more material components in a dry powder or granular form.

The apparatus 10 may optionally be provided with a vibrator, agitator system or other similar device 32 designed to assist gravitational force inducing dry powder or granular material 1 into the conveyor 14. The vibrator 32 is preferably secured at or near the bottom of the bulk material tank 12, as shown in the figure.

The operation of the apparatus 10 will now be described as follows. First, the horizontal section 16 of the conveyor 14 draws dry powder or granular material 22 from the base of the bulk material tank 12 and conveys it to the junction box 20, as shown by the large arrow in the figure. Because the dry powder or granular material 1 is drawn from the bottom of the bulk material tank 12, it has a tendency to clump together (densify) due to compacting. The rotational movement of the auger, however, breaks up (loosens) these clumps and thereby returns the material to its original powder or granular state.

The vertical section 18 of the conveyor 14 then transports the dry powder or granular material 1 from the junction box 20 to the hopper 24 through chute 22, as again indicated by the large arrow in the figure. The conveyor 14 is designed and operated to convey the dry powder or granular material 1 to the hopper 24 at a bulk rate that exceeds the maximum rate at which the metering feeder 26 is capable of transporting the dry powder or granular material out of the bulk material tank 12. Because the hopper 24 is located above the fill line of the dry powder or granular material in the bulk material tank 12, the overflow of the dry powder or granular material 1 being delivered to the hopper by the conveyor 14 spills back into the tank. Therefore, the hopper 24 continuously overfills and spills over. The excess powder or granular material is then recycled back to the conveying system while the hopper 24 remains at a consistent powder or granular level and consistent material density. Any dusting is confined to the bulk material tank 12.

The metering feeder 26 then meters the dry powder or granular material 1 out of the bulk material tank 12 in very precise volumetric amounts. Because the dry powder or granular material 1 is in a powder or granular state when it is fed into the metering feeder 26 and the hopper 24 is always kept full so that a constant volume of dry powder or granular material 1 is always being drawn by the metering feeder 26, the apparatus 10 is capable of delivering the dry powder or granular material 1 out of the bulk material tank 12 at a substantially uniform density. Also, because the apparatus 10 is substantially closed, i.e., it is only open at the discharge chute 28, the apparatus is able to deliver the dry powder or granular material 1 to mixing blender 30 substantially dust free.

Figure 2:
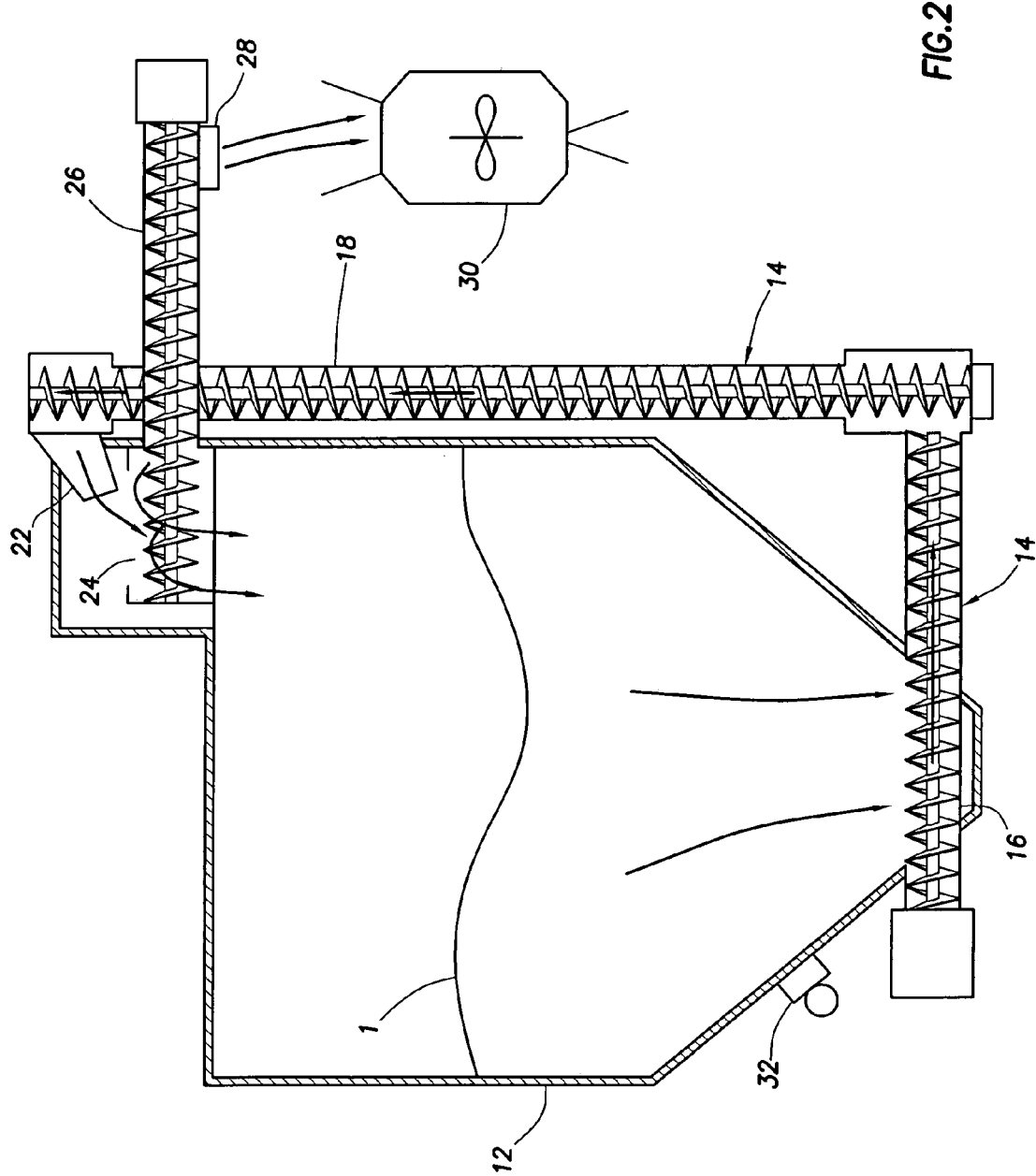
FIG. 2 is a schematic diagram of an alternative embodiment of an apparatus for accurately metering and conveying a dry powder or granular material to a blender in accordance with the present invention.
Figure 3:
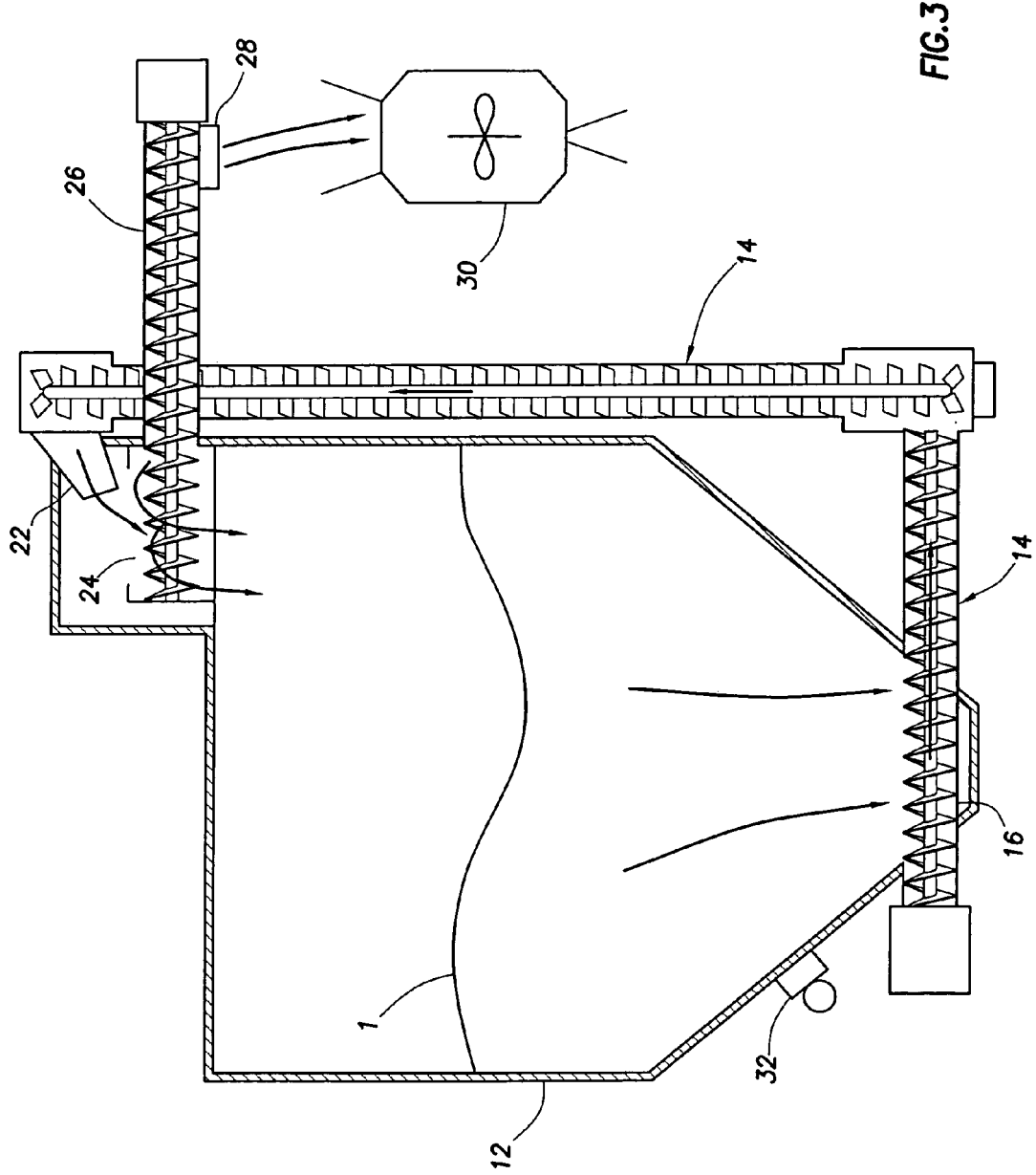
FIG. 3 is a schematic diagram of an alternate embodiment of the apparatus shown in FIG. 2 wherein the vertical section of the conveyor is a bucket elevator.

In an alternate embodiment according to the present invention, the vertical section 18 of the conveyor 14 is disposed completely outside of the bulk material tank 12, as shown in FIG. 2. In this embodiment, the metering hopper 24 is disposed above the rest of the bulk material tank 12, so that the dry powder or granular material is permitted to overflow into the main portion of the tank. In this embodiment, the top of the bulk material tank 12 housing has a raised section for accommodating the hopper 24. This design permits the bulk material tank 12 to be filled virtually to the top and, thus maximize the storage capacity of the tank, while at the same time achieving the benefits of the present invention. In an alternate embodiment of the one shown in FIG. 2, the vertical section 18 of the conveyor 14 is a bucket elevator rather than an auger-type conveyor, as shown in FIG. 3.

Therefore, the present invention is well-adapted to carry out the objects and attain the ends and advantages mentioned as well as those which are inherent therein. While the invention has been depicted, described, and is defined by reference to exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for accurately metering and conveying a dry powder or granular material comprising:
   a tank adapted to store the dry powder or granular material;
   a hopper disposed inside of the tank;
   a conveyor that delivers the dry powder or granular material from the tank to the hopper in a substantially enclosed environment; and
   a metering feeder disposed at least partially within the tank and adapted to deliver the dry powder or granular material from the hopper at a substantially uniform density.

2. The apparatus according to claim 1 wherein the tank has a funnel-shaped bottom.

3. The apparatus according to claim 2 wherein the conveyor comprises a horizontal section disposed at the bottom of the tank, which draws the dry material from the bottom of the tank.

4. The apparatus according to claim 3 wherein the conveyor further comprises a vertical section, which conveys the dry powder or granular material from the bottom of the tank to the hopper.

5. The apparatus according to claim 4 wherein the vertical section of the conveyor is partially disposed within the tank.

6. The apparatus according to claim 4 wherein the vertical portion of the conveyor is disposed completely outside of the tank.

7. The apparatus according to claim 4 wherein the vertical section of the conveyor comprises a bucket elevator.

8. The apparatus according to claim 4 wherein the horizontal and vertical sections of the conveyor comprise screw-type augers.

9. The apparatus according to claim 4 wherein the vertical section of the conveyor further comprises a chute for directing the dry powder or granular material into the hopper.

10. The apparatus according to claim 1 wherein the hopper is disposed in the tank at a location above where the dry powder or granular material is held.

11. The apparatus according to claim 10 wherein the hopper has an open top that allows the dry powder or granular material to overflow into the tank.

12. The apparatus according to claim 2 further comprising an agitator or vibrator that causes the dry powder or granular material to settle at the bottom of the tank.

13. An apparatus for accurately metering and conveying a dry powder or granular material comprising:
    means for storing the dry powder or granular material;
    means for metering the dry powder or granular material out of the storing means at a substantially uniform density; and
    means for supplying the metering means with the dry powder or granular material at a bulk rate that exceeds the rate at which the metering means conveys the dry powder or granular material and in a substantially enclosed environment.

14. The apparatus according to claim 13 wherein the storing means comprises a bulk material tank.

15. The apparatus according to claim 13 wherein the metering means comprises a metering feeder.

16. The apparatus according to claim 13 wherein the supplying means comprises a hopper from which the metering means draws dry powder or granular material.

17. The apparatus according to claim 16 wherein the supplying means further comprises a conveyor for delivering dry powder or granular material to the hopper.

18. The apparatus according to claim 17 wherein the supplying means further comprises a chute for directing dry powder or granular material from the conveyor to the hopper.

19. The apparatus according to claim 17 wherein the conveyor comprises a screw-type auger.

20. The apparatus according to claim 17 wherein the conveyor comprises a bucket elevator.

21. The apparatus according to claim 17 wherein the conveyor comprises a horizontal section and a vertical section.

22. The apparatus according to claim 21 wherein the storage means has a funnel-shaped bottom and the horizontal section of the conveyor draws dry powder or granular material from the bottom of the storage means.

23. The apparatus according to claim 21 wherein the vertical section of the conveyor is partially disposed within the tank.

24. The apparatus according to claim 21 wherein the vertical portion of the conveyor is disposed completely outside of the tank.

25. The apparatus according to claim 13 wherein the metering means further comprises a chute for discharging the dry powder or granular material from the tank.

26. A method of accurately metering and conveying a dry powder or granular material comprising the steps of:
    storing the dry powder or granular material in a storage tank;
    metering dry powder or granular material out of the storage tank at a substantially uniform density with a metering feeder; and
    supplying the metering feeder with dry powder or granular material at a bulk rate that exceeds the rate at which the metering feeder conveys the dry powder or granular material and in a substantially enclosed environment.

* * * * *